UNITED STATES PATENT OFFICE.

JAMES R. McCLINTOCK, OF NEW ORLEANS, LOUISIANA.

IMPROVEMENT IN COMPOSITIONS FOR PAVING AND ROOFING.

Specification forming part of Letters Patent No. 163,223, dated May 11, 1875; application filed April 3, 1875.

CASE B.

*To all whom it may concern:*

Be it known that I, JAMES R. MCCLINTOCK, of New Orleans, in the parish of Orleans and State of Louisiana, have invented a Fluid Asphaltum for Paving, Roofing, and other purposes, of which the following is a specification:

The object of my present improvement is to reduce asphaltum to a liquid and hold the same in a semi-fluid condition without heat, and furnish to the trade an exceedingly cheap article of asphaltum prepared and ready for use, without the labor, expense, and delay of melting, for paving and roofing purposes, and one most admirably adapted for use by manufacturers of varnish and japan.

Heretofore asphaltum has been put up in a solid form, which must be melted for use, thus requiring an outlay in apparatus and necessitating the destruction of the containing-vessel. By my invention expense from these causes is avoided. The asphaltum is put up ready for use in a compact yet convenient form, without requiring to reduce it to a condition fit for use by the employment of heating or other apparatus. The barrels also may be used again and again.

The nature of my invention consists in producing a semi-fluid solution of asphaltum in benzine, naphtha, or other similar hydrocarbon, put up and ready for use without being melted for paving, roofing, and other purposes, substantially as hereinafter described.

The construction and operation of my invention are as follows: I take the crude asphaltum, either Trinidad or Cuban, and pulverize or reduce the same to a fine or a coarse powder, and then place it in a suitable vessel and pour in the naphtha, benzine or benzole, or other bituminous liquid. The mass is then agitated or stirred by any suitable means, and the asphaltum is rapidly dissolved, the solvent readily taking up from four to eight times its quantity, according to the use in connection with which the asphaltum is to be employed, and consequently the degree of consistency required. The fluid asphaltum thus obtained can readily be barreled and transported, and is ready for use without being heated, or any heat whatever having been used in producing the fluid asphaltum. For some purposes it may be advantageous to mix with the bituminous liquid which I use as a solvent a small per cent. of the spirits of turpentine of commerce. The naphtha and benzine may be rendered odorless before being mixed through the action of chlorine or any other well-known deodorizing agent.

What I claim as new, and desire to secure by Letters Patent of the United States, is—

A semi-fluid solution of asphaltum in benzine, naphtha, or other similar light hydrocarbons, put up and ready for use for paving, roofing, and other purposes, substantially as described.

In testimony whereof I have signed my name to this specification in the presence of two subscribing witnesses.

JAMES R. McCLINTOCK.

Witnesses:
 EDWIN JAMES,
 JOS. T. K. PLANT.